United States Patent
Nguyen et al.

(10) Patent No.: US 7,761,098 B1
(45) Date of Patent: Jul. 20, 2010

(54) HANDSET MODE SELECTION BASED ON USER PREFERENCES

(75) Inventors: Hieu Nguyen, Colleyville, TX (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 11/758,488

(22) Filed: Jun. 5, 2007

(51) Int. Cl.
*H04W 1/00* (2006.01)

(52) U.S. Cl. ............. 455/435.2; 455/435.1; 455/456.1; 455/436; 455/422

(58) Field of Classification Search ............. 455/435.2, 455/435.1, 456.1, 436, 442
See application file for complete search history.

(56) References Cited

U.S. PATENT DOCUMENTS

| | | | |
|---|---|---|---|
| 6,327,470 B1 * | 12/2001 | Ostling ........................ 455/437 |
| 6,771,964 B1 | 8/2004 | Einola et al. |
| 6,985,720 B2 | 1/2006 | Qu et al. |
| 2003/0017842 A1 * | 1/2003 | Moles et al. ................. 455/552 |
| 2003/0114158 A1 * | 6/2003 | Soderbacka et al. ......... 455/436 |
| 2003/0224814 A1 | 12/2003 | Qu et al. |
| 2004/0097232 A1 * | 5/2004 | Haverinen .................. 455/436 |
| 2004/0203945 A1 | 10/2004 | Qu et al. |
| 2005/0021826 A1 * | 1/2005 | Kumar ........................ 709/232 |
| 2005/0027841 A1 | 2/2005 | Rolfe |
| 2005/0083899 A1 * | 4/2005 | Babbar et al. ................ 370/342 |
| 2005/0163078 A1 | 7/2005 | Oba et al. |
| 2005/0176445 A1 | 8/2005 | Qu et al. |
| 2005/0902791 | 9/2005 | Krause |
| 2005/0265284 A1 | 12/2005 | Hsu et al. |
| 2007/0032239 A1 * | 2/2007 | Shaheen et al. ............. 455/436 |
| 2007/0135121 A1 * | 6/2007 | Bae et al. .................. 455/432.1 |

OTHER PUBLICATIONS

Jones, Bryce A., et al, Multi-Mode Mobile Station and Method of Changing its Network Connectivity, Filing Date—Aug. 26, 2004, U.S. Appl. No. 10/927,271, Specifciation (32 pages), Drawings (3 sheets), Filing Receipt (2 pages).
Jones, Bryce A., et al, Multi-Mode Mobile Station and Method of Changing its Network Connectivity Using a Network Acknowledgement, Filing Date—Sep. 3, 2004, U.S. Appl. No. 10/933,596, Specifciation (33 pages), Drawings (3 sheets), Filing Receipt (2 pages).
Jones, Bryce A., et al, Multi-Mode Mobile Station and Method of Changing its Network Connectivity Using a Quality Monitoring, Filing Date—Sep. 3, 2004, U.S. Appl. No. 10/934,011, Specifciation (32 pages), Drawings (3 sheets), Filing Receipt (2 pages).
"Melding of cell phones and Wi-Fi will be cosmic, man," UST Today, Aug. 23, 2005, 3 pages.

* cited by examiner

*Primary Examiner*—Joseph H Feild
*Assistant Examiner*—Huy D Nguyen

(57) ABSTRACT

A multi-mode wireless device is provided to communicate with a plurality of networks, at least some of the networks having different modes of communication. The multi-mode wireless device has a network selection component to monitor at least some of networks and switch the multi-mode wireless device to communicate with different networks based on a network selection criterion. The user interface allows a user of the multi-mode wireless device to edit the network selection criterion based on a user preference related to the network used by the multi-mode wireless device. A method for communicating on one or more networks using a multi-mode wireless device is also provided.

8 Claims, 3 Drawing Sheets

HANDSET MODE SELECTION BASED ON USER PREFERENCES

CROSS-REFERENCE TO RELATED APPLICATIONS

This application claims priority to and benefit under 35 USC §120 to U.S. patent application Ser. No. 10/983,823 filed Nov. 8, 2004, now U.S. Pat. No. 7,245,913, issued on Jul. 17, 2007, entitled "Handset Mode Selection Based on User Preferences", by Hieu Nguyen et al., inventors, and is hereby incorporated by reference for all purposes.

This application contains subject matter that is similar to and hereby incorporates by reference for all purposes U.S. patent application Ser. No. 10/927,271, filed Aug. 26, 2004, entitled "Multi-Mode Mobile Station and Method of Changing its Network Connectivity", Jones et al. inventors, U.S. patent application Ser. No. 10/933,596, filed Sep. 3, 2004, entitled "Multi-Mode Mobile Station and Method of Changing its Network Connectivity using Quality Monitoring", Jones et al. inventors, and U.S. patent application Ser. No. 10/934,011, filed Sep. 3, 2004, entitled "Multi-Mode Mobile Station and Method of Changing its Network Connectivity using a Network Acknowledgement", Jones et al. inventors.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software for mobile communications, and more particularly, but not by way of limitation, to a system and method for selecting a communication mode of a multi-mode handset based on preferences.

BACKGROUND OF THE INVENTION

Some wireless devices are able to communicate using either of two different communication modes and may be referred to as multi-mode wireless devices. For example, a multi-mode wireless handset may be able to communicate using either a code division multiple access (CDMA) communication mode or an analog communication mode. Multi-mode wireless devices may select a communication mode based on signal strength of the available modes, for example selecting the communication mode with the greatest signal strength.

Wireless networks may have been built at different times. Different wireless networks may have different coverage. For example, in a first area a first wireless communication mode may be supported by a first wireless infrastructure, but a second wireless communication mode may not be supported by a second wireless infrastructure in that first area. In a second area, the first wireless communication mode may not be supported by the first wireless infrastructure, but the second wireless communication mode may be supported by the second wireless infrastructure in that second area.

SUMMARY OF THE INVENTION

In one embodiment, a multi-mode wireless device is provided to communicate with a plurality of networks, at least some of the networks having different modes of communication. The multi-mode wireless device has a network selection component to monitor at least some of networks and switch the multi-mode wireless device to communicate with different networks based on a network selection criterion. The user interface allows a user of the multi-mode wireless device to edit the network selection criterion based on a user preference related to the network used by the multi-mode wireless device.

In another embodiment, the present invention provides a multi-mode wireless device operable to communicate with a plurality of networks, at least some of the networks having different modes of communication. The multi-mode wireless device may include a plurality of mode components, a user interface, and a mediator component. Each of the mode components are provided for communication with one of the networks according to one of the modes. The user interface is operable during a communication session for a user to select one of the plurality of networks for communication using the multi-mode wireless device. The mediator component is coupled to promote one of the mode components for communication by the multi-mode wireless device with one of the networks based on the network selected by the user via the user interface.

In one embodiment, the present disclosure provides a method for communicating using a multi-mode wireless device. The method includes a user using the multi-mode wireless device for communication, via a first network. The method includes the user selecting, via a user interface and during the communication, whether to switch to a second network for communication by the multi-mode wireless device. The method also includes the user continuing the communication using the multi-mode wireless device via one of the first and second networks selected by the user.

Another disclosed method provides a method for communicating using a multi-mode wireless device. The method includes defining one or more preferences of modes of the multi-mode wireless device, and evaluating the accessibility of modes of the multi-mode wireless device. The method includes establishing a first communication according to a first mode of the multi-mode wireless device based on one of the preferences and on the accessibility of the modes of the multi-mode wireless device. The method also includes moving the multi-mode wireless device from a first location to a second location. The method further includes establishing a second communication according to a second mode of the multi-mode wireless device based on the preferences and on the accessibility of the modes of the multi-mode wireless device. The method also includes discontinuing the first communication according to the first mode of the multi-mode wireless device.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Multi-mode wireless devices may select the communication mode based on the strongest signal strength received by the multi-mode wireless device. This selection rule may optimize the efficiency of the network infrastructures, for example maximizing the number of active calls that can be carried within a wireless cell, but may not accommodate the preferences of the user of the multi-mode wireless device. For example, the user of the multi-mode wireless device may prefer to select a communication mode with a lower cost and/or a higher bandwidth and/or a higher perceived quality that has a lesser but nevertheless adequate signal strength rather than select a communication mode that has a higher cost or a lower bandwidth or a lower perceived quality that has a greater signal strength. The present disclosure describes a system and methods employing individual preferences to select the active communication mode of a multi-mode mobile device.

Figure 1:
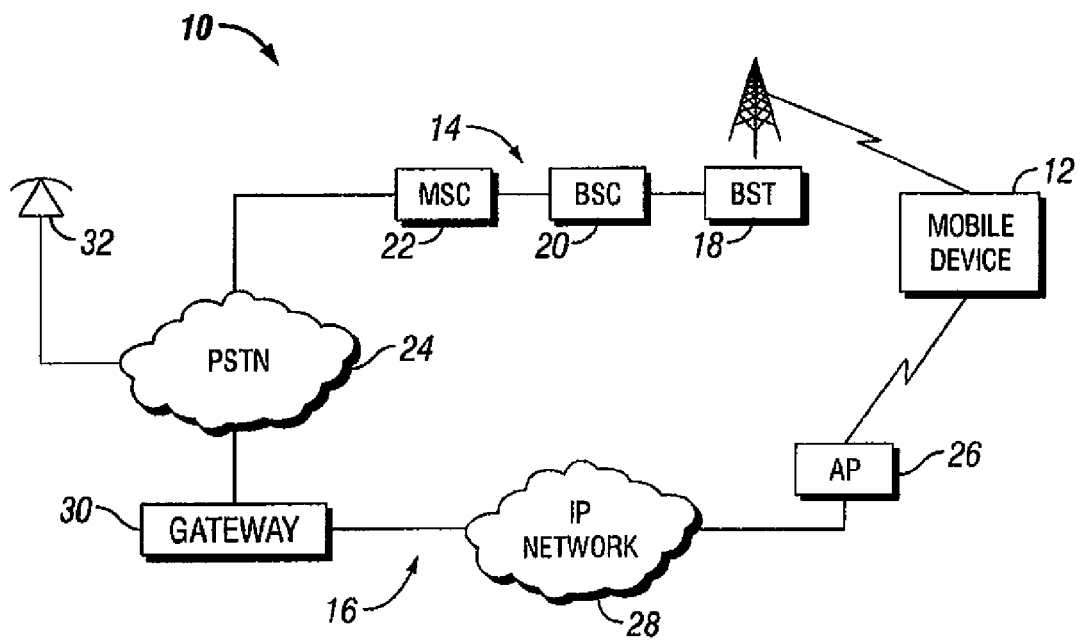
FIG. 1 depicts a block diagram of a communication system for implementing an embodiment of the disclosure.

Turning now to FIG. 1, a system 10 for using a multi-mode wireless device that selects the active communication mode based on individual preferences is depicted. A mobile device 12 is a multi-mode device and is in communication with a first network 14 and a second network 16. The first network 14 comprises a base station transceiver (BST) 18, a base station controller (BSC) 20, and a mobile switching center (MSC) 22. The base station transceiver 18 is in radio communication with the mobile device 12 according to a first communication mode. The base station controller 20 is coupled to the base station transceiver 18 and to the mobile switching center 22. The base station controller 20 links the base station transceiver 18 to the mobile switching center 22. The mobile switching center 22 is coupled to a public switched telephone network (PSTN) 24 and bridges the first network 14 to the public switched telephone network 24. In an embodiment, the first network 14 is a code division multiple access network and the mobile device 12 is a mobile phone, handset, personal digital assistant (PDA), wirelessly equipped computer, such as a desktop or laptop, or other wireless communication device.

The second network 16 comprises a wireless local area network (WLAN) access point (AP) 26, an internet protocol (IP) network 28, and a gateway 30. The wireless local area network access point 26 is in radio communication with the mobile device 12 according to a second communication mode. In an embodiment, the wireless local area network access point 26 communicates with the mobile device 12, for example according to the IEEE 802.11 wireless local area network protocol. The wireless local area network supported by the wireless local area network access point 26 may be referred to as a WiFi network or WiFi personal area network. The internet protocol network 28 is coupled to the wireless local area network access point 26 and provides network access to the local area network access point 26. The internet protocol network 28 is coupled to the gateway 30. The gateway 30 is coupled to the public switched telephone network 24 and bridges the public switched telephone network 24 to the internet protocol network 28. The present disclosure is not limited to these networks and may include other types of networks, which will readily suggest themselves to one skilled in the art.

A fixed handset 32 is coupled to the public switched telephone network 24 and may originate calls to or terminate calls from the mobile device 12. The calls route over either the first network 14 or the second network 16. In other embodiments different network types may be combined as the first network 14 and the second network 16, including a global system for mobile communications (GSM) network, a universal mobile telecommunications system (UMTS), and an analog cellular network, such as an advanced mobile phone service (AMPS) network. In some embodiments, all or parts of the communications may occur in a digital format, such as code division multiple access (CDMA), time division multiple access (TDMA), or other well known or hereafter developed formats. The wireless communication between various access points and mobile device 12 may conform to or make use of IEEE 802.11a, IEEE 802.11b, IEEE 802.11e, IEEE 802.11g, or IEEE 802.11h standards (referred to generally herein as "802.11x"), or variations thereof. These 802.11x standards are incorporated herein by reference. Alternatively or additionally, the wireless communication may conform to or make use of Bluetooth specifications, HomeRF specifications, of HiperLAN standards, or may occur in a cordless communication format or a Multichannel Multipoint Distribution Service (MMDS) format, or may involve some other wireless protocol or format.

The mobile device 12 stores one or more preferences that are individual to the particular mobile device 12 and which may or may not be independent from the preferences stored in similar mobile devices 12. In an embodiment, the mobile device 12 stores a preference for one of two available communication modes. For example, the mobile device 12 may store a preference for routing communications over the second network 16. Although two communication modes are described, the mobile device 12 may be capable of communicating according to more than two communication modes. When the fixed handset 32 originates a phone call to the mobile device 12 and both the first network 14 and the second network 16 provide adequate signal strength to the mobile device 12, for example, the call could route over either the first network 14 or the second network 16. In this case, the call is routed over the second network 16 responsive to the individual preference selected by the user to route communications over the second network 16. In the present example, before the fixed handset 32 originates the exemplary phone call to the mobile device 12, the mobile device 12 may have sent a message to the first network 14 to indicate that phone calls that would otherwise be routed to the mobile device 12 over the first network 14 are to be routed to the mobile device 12 via the second network 16.

The first network 14 or the public switched telephone network 24 may store this routing information, for example in a database such as a signaling system 7 (SS7) service control point (SCP), a home location register (HLR), or a visiting location register (VLR). The mobile device 12 monitors the signal strength of the second network 16, and in the case that the signal strength of the second network 16 is not great enough, such as when the mobile device 12 moves out of range of the second network 16, the mobile device sends a message to the first network 14 to indicate that phone calls should be routed to the mobile device 12 via the first network 14, reversing the earlier message. The mobile device 12 may also send a message to the second network 16 to indicated that phone calls should be routed to the mobile device 12 via the first network 14. Sending a message to the first network 14 or the second network 16 to define routing may be referred to as selecting routing. The mobile device 12 may send the message selecting routing before the signal strength drops to an unacceptable level to avoid dropping a call. The decision of when to send the message due to declining signal strength may take into account the time rate of change of the signal strength.

In another embodiment, other individual preferences may be defined. The mobile device 12 may provide a manual switching button to cause a message to be sent out to the first network 14 and the second network 16 indicating that communication to the mobile device 12 is to be routed to the mobile device 12 over the first network 14. A special wireless local area network access point, for example an access point located in the home of the user, may be designated to the mobile device 12. An individual preference may be defined which indicates that routing of communication to the mobile device 12 over the second network 16 is preferred. Additionally, the preference may be defined so that once the mobile device 12 has moved within the range of the designated wireless local area network access point 26 the automatic mode selection by the mobile device 12 is disabled. In this case, the mobile device 12 sends a message to the first network 14 and to the second network 16 indicating that communication to the mobile device 12 is to be routed to the mobile device 12 over the first network 14 when the manual switching button is activated. The mobile device 12 discriminates the designated wireless local area network access point 26 from other wireless local area network access points 26. The mobile device 12 may discriminate the designated wireless local area network access point 26 based on information configured into the mobile device 12 from the user interface of the mobile device 12, for example a media access control (MAC) address.

In one embodiment, the user interface 58 is operable to notify the user, such as via an audible tone, text displayed on a display screen or both, before switching networks to allow the user to confirm or authorize switching networks. For example, during a call the mobile device 12 may determine that switching from one network to another is warranted, such as for reasons of poor signal or service quality of one network. The mobile device 12 may prompt the user, via the user interface 58, to accept or reject the switch. This functionality may also be enabled to notify the user before switching networks even when the user is not using the mobile device 12 for a call or other communication. The user initiated or authorized network switching may be useful, for example, when a user is at their home or other location where the user is familiar and satisfied with the quality of service and cost of service on a particular. In this instance, if the mobile device 12 prompted the user to switch to another network, the user would likely deny the switch, since the service is more expensive on the other network. However, when a user is in an area where the quality of service is unknown, the user might accept the switch during a call. This is important to the user so that the call is not dropped due to bad service.

Where the user decides not to switch networks after prompting, the user may manually switch networks thereafter, via the user interface 58. This feature may be useful, for example, where the quality of service from the perspective of the mobile device 12 has degraded such that a switch is warranted, but the degraded service does not interfere with the user's communication. In this case, the user may opt to stay on the current network, such as where service on the alternate network is costly. However, if the service, from the perspective of the user, subsequently degrades such that it interferes with the user's communication, the user may then use the user interface 50 to manually change the mobile device 12 to communicate via the second network.

Further, the user interface 58 may enable timed or delayed switching, allowing the user to cause the mobile device 12 to switch networks at a particular time of day or after a certain interval, such as one minute after prompting. The user interface 58 may include various other capabilities for use of this functionality by users, such as "one-button" selection to maintain service on the current network after prompting to prevent further prompting by the user interface 58. The "one-button" features may be programmed, for example, to delay and prompt again after a predetermined time, such as one minute if the mobile device 12 continues to recommend switching networks. Numerous other features of the user interface 58 will readily suggest themselves to one skilled in the art in light of the present disclosure, all of which are within the spirit and scope of the present disclosure.

In one embodiment, the mobile device 12 includes a first interface for wireless communication with a wireless wide-area network (WWAN) using CDMA and a second interface for wireless communication with a wireless local area network (WLAN), e.g., using 802.11x. However, in other embodiments, the mobile device may have more than two interfaces, may use other types of wireless access technologies, and may communicate with wireless networks other than WWANs and WLANs.

Figure 2:
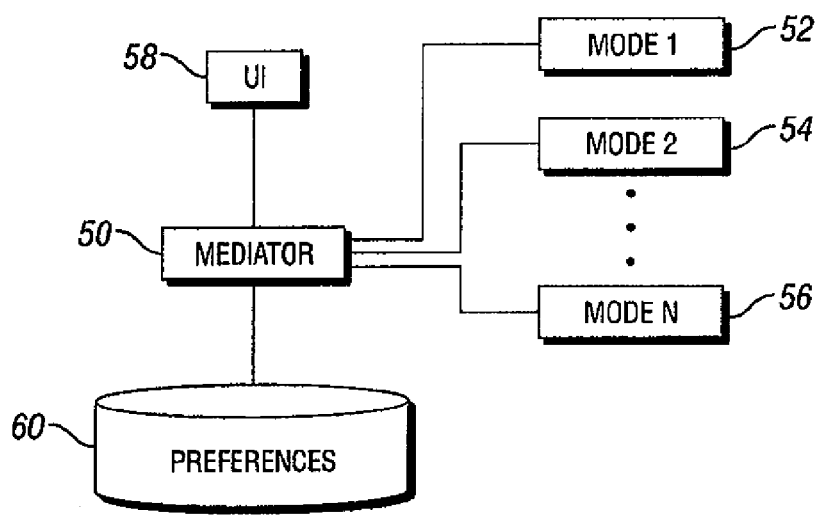
FIG. 2 depicts a block diagram of functional units within a mobile device according to an embodiment of the present disclosure.

Turning now to FIG. 2, a block diagram of an exemplary functional architecture of the mobile device 12 is depicted. A mediator component 50 is coupled to a plurality of communication mode components—a first communication mode component 52, a second communication mode component 54, and a third communication mode component 56. The mediator component 50 acts as a central clearinghouse of information and a central decision making point for the mobile device 12. For example, the mediator component 50 may analyze signal strength information provided by each of the communication mode components 52, 54, and 56 and decide when to send messages selecting routing to networks, for example to the first network 14 and to the second network 16. The mediator component 50 is coupled to a user interface 58 and a preferences store 60. The user interface 58 may be employed to define user preferences that the mediator component 50 stores in the preferences store 60. The user interface 58 may also be employed to receive activation of a manual routing selection button and to send this information to the mediator component 50.

In the various embodiments, the mediator 50 may select the appropriate network 14 or 16 based on the desired service or services and/or based on the rules for selecting the appropriate network, or combinations thereof. The present invention contemplates that numerous services, such as, but not limited to, voice, data, instant messaging, and/or other services known to those skilled in the art or hereafter developed, may be used on the networks 14 or 16 or other types of networks. Further, based on the availability, signal strength, cost and/or other rules or selections by the user, a first service, such as voice, may be carried over one network, such as a WIFI network, while a second service, such as instant messaging, may be simultaneously carried over a second network, such as a CDMA network.

Figure 3:
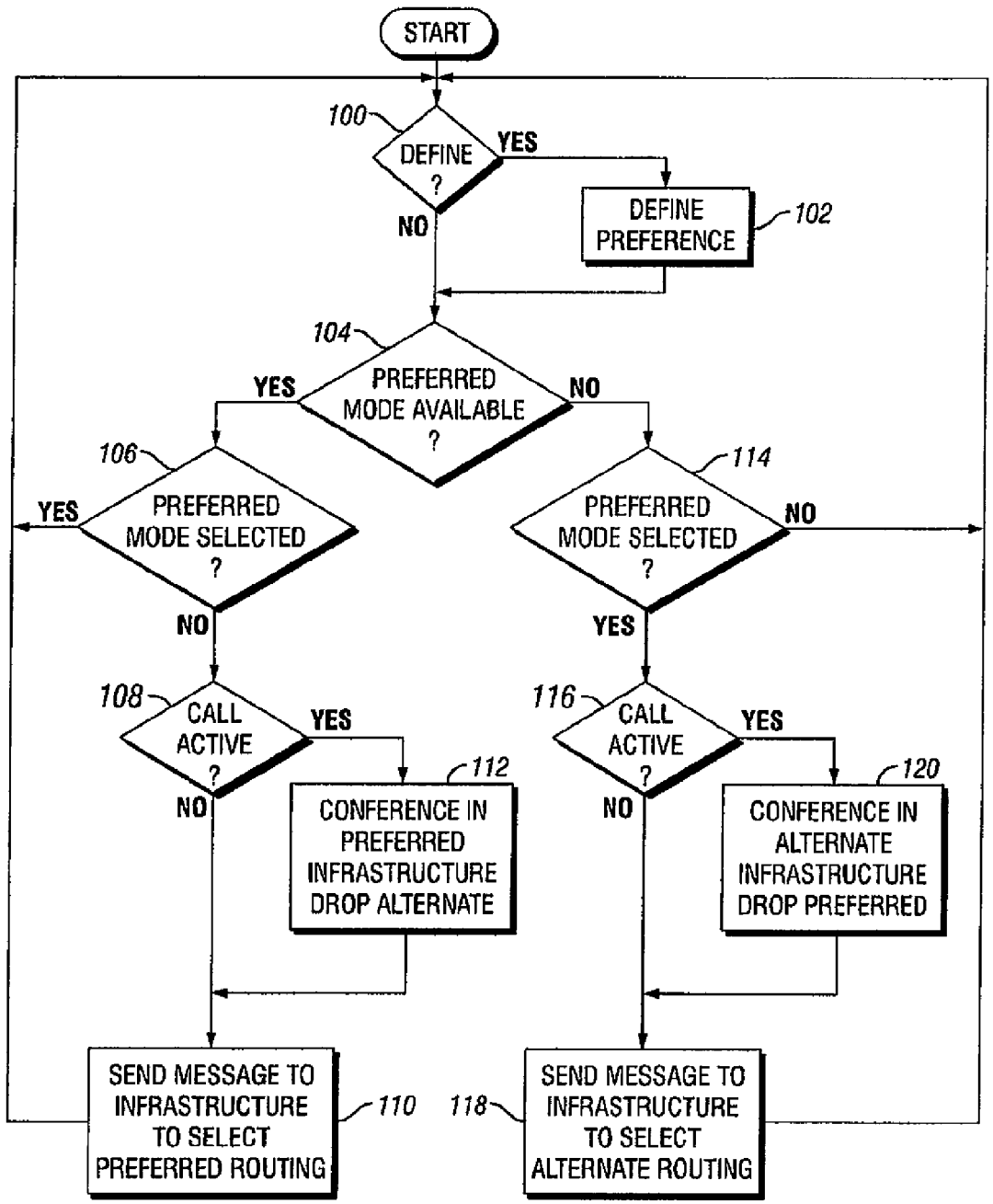
FIG. 3 is a flow chart of a method for implementing an embodiment of the disclosure.

Turning to FIG. 3, a flow chart depicts a method for a multi-mode wireless device, such as the mobile device 12, to select an active communication mode based on preferences. The method begins in block 100 where if the preferred communication mode is being defined or redefined, the method proceeds to block 102 where the preferred communication mode is defined and stored in the mobile device 12. The preferred communication mode may be changed employing a user interface of the mobile device 12, for example by using a key pad of the mobile device 12 to enter text and/or to select displayed menu items. The method proceeds to block 104 where if the preferred communication mode is available, for example the preferred communication mode provides an adequate signal strength, the method proceeds to block 106.

In block 106 if the preferred communication mode routing is already selected, the method proceeds to block 100. In block 106, if the preferred communication mode routing is not already selected, for example the alternate communication mode routing is selected, the method proceeds to block 108. In block 108 if no phone call is active, the method proceeds to block 110 where the mobile device 12 sends one or more messages to the network infrastructure, for example to the first network 14 or to the second network 16, to select the preferred communication mode routing. The first network 14 and the second network 16 respond to the message from the mobile device 12 by redefining the routing plans or routing provisioning of communications directed to the mobile device 12. Redefining routing plans may be accomplished by storing new routing information in one or more nodes of the first network 14 and/or the second network 16, for example in a database such as a signaling system 7 service control point, a home location register, or a visiting location register.

After the preferred communication mode is selected, the method returns to block 100. In block 108 if a phone call is active, the method proceeds to block 112 where the in-progress call is conferenced over the preferred communication mode routing. This is similar to establishing a conference call where a first telephone originates a call to a second telephone and then the first or the second telephone originates a conference call or a three-way call to a third telephone. In the present disclosure, however, the third telephone and the second telephone may be the same mobile device 12. After the in-progress call is conferenced over the preferred communication mode routing, the in-progress call is dropped by the alternate communication mode routing. Two-way communication is then resumed. The method proceeds to block 112.

In block 104, if the preferred communication mode is not available, the method proceeds to block 114. In block 114 if the preferred communication mode routing is not selected, the method proceeds to block 100. In block 114, if the preferred communication mode routing is already selected, the method proceeds to block 116. In block 116 if no phone call is active, the method proceeds to block 118 where the mobile device 12 sends a message to the network infrastructure, for example to the first network 14 or to the second network 16, to select the alternate communication mode routing. Thereafter, the method returns to block 100. In block 116 if a phone call is active, the method proceeds to block 120 where first the in-progress call is conferenced over the alternate communication mode routing and the in-progress call is dropped by the preferred communication mode routing. Thereafter, the method proceeds to block 118.

The availability of the preferred communication mode may depend upon conditions other than or in addition to signal strength such as an error rate or a signal to noise ratio of the signal. Checking for availability may involve, for example, checking for radio frequency (RF) emissions of the type used by various systems of the network. Alternatively, the mobile device 12 may determine whether the preferred communication mode is available in other ways. For example, even before the quality of one connection falls below the predetermined level, the mobile device 12 may have already been checking for the availability of the second or other network modes and, thus, may have already determined the availability of another mode. In particular, mobile device 12 may periodically check for the availability of the second network or network for communication other than the preferred mode network, independent of the quality of the preferred mode network. Alternatively, the mobile device 12 may check for availability of the other networks or desired communication modes based on information about its location or movement. Examples of such approaches are described in U.S. patent application Ser. No. 10/391,158, filed Mar. 18, 2003, now U.S. Pat. No. 7,277,170, issued Oct. 2, 2007 titled "Method for Determining Availability of a Radio Network," and in U.S. patent application Ser. No. 10/629,406, filed Jul. 29, 2003, now U.S. Pat. No. 7,200,397, issued Apr. 3, 2007, titled "Method for Determining Availability of a Radio Network," which applications are incorporated herein by reference.

The mobile device 12 may use various criteria, such as combinations of the above described techniques, to determine the availability and select a particular network for service. In one embodiment, the criteria for network availability and network selection may be maintained by the user interface 58 of the mobile device 12. In this manner, the user may view and edit the criteria and include user preferences of the preferred network for service. For example where the network or mobile device 12 is equipped with GPS (global positioning system) capability or other location based capabilities, the user may select for the mobile device 12 to use a specific network whenever the mobile device 12 is within a certain distance of the user's home. Thus the user, via the user interface 58, may modify the network selection preference to control the circumstances under which the mobile device 12 will use or switch to certain networks.

Other examples may include that the user may select, via the user interface 58, to prohibit the mobile device 12 from automatically switching between networks during calls without user confirmation. Such functionality gives the user further control over the cost and quality of service of the network and mobile device 12. Other examples of network availability and selection criteria maintained by the mobile device 12 and user interface 58, and editable or programmable preferences selectable by the user will readily suggest themselves to one skilled in the art when presented with the present disclosure.

Figure 4:
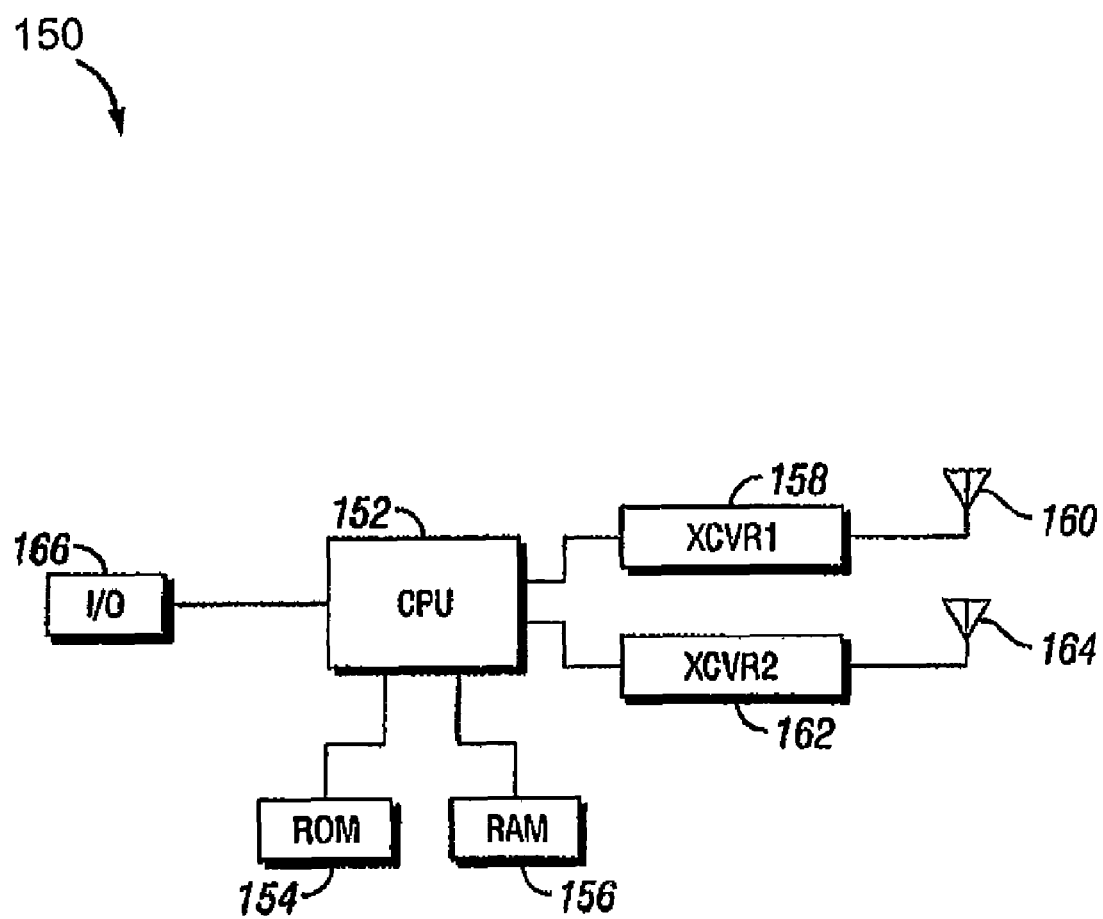
FIG. 4 illustrates an exemplary multi-mode mobile handset suitable for implementing the several embodiments of the disclosure.

The system 10 described above may be implemented on any mobile communication device such as is well known to those skilled in the art. One embodiment is implemented on a multi-mode mobile handset. An exemplary multi-mode mobile handset system 150 for implementing one or more embodiments disclosed herein is illustrated in FIG. 4. The multi-mode mobile handset includes a processor 152 (which may be referred to as a central processor unit or CPU) that is coupled to memory devices including a read only memory (ROM) 154, a random access memory (RAM) 156, a first transceiver 158 that is coupled to a first antenna 160, a second transceiver 162 that is coupled to a second antenna 164, and an input/output (110) device 166. The processor may be implemented as one or more CPU chips.

The ROM 154 is used to store instructions and perhaps data which are read during program execution. ROM 154 is a non-volatile memory device. The RAM 156 is used to store volatile data and perhaps to store instructions. The ROM 154 may include flash memories or electrically erasable programmable memory to support updating the stored instructions remotely, for example through an over-the-air interface via the transceivers 158 and/or 162 and the antennas 160 and/or 164.

The transceivers 158, 162 and the antennas 160, 164 support radio communications according to the first communication mode and the second communication mode. The I/O device 166 may be a keypad and a visual display such as a liquid crystal display to permit entering numbers and selecting functions of the mobile device 12. The I/O device 166 may provide soft keys using text in the visual display as is well known to one of ordinary skill in the art. The processor 152 executes instructions, codes, computer programs, scripts which it accesses from ROM 154 or RAM 156.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for communicating using a multi-mode wireless device, comprising:

actively communicating with a first network using the multi-mode wireless device;

during the active communication and responsive to the multi-mode wireless device determining that switching to a second network is warranted, prompting via a user interface to select whether to switch to the second network; and continuing the active communication using the multi-mode wireless device via the first network responsive to the multi-mode wireless device receiving a selection from the user interface not to switch to the second network;

switching to the second network, after initially receiving the selection not to switch to the second network in response to the prompting, responsive to the user interface later, without prompting via the user interface, receiving a second selection to switch to the second network; and continuing the active communication using the multi-mode wireless device via the second network responsive to the second selection.

2. The method of claim 1, wherein the first network is a wireless local area network and the second network is a cellular network.

3. The method of claim 2, wherein the cellular network comprises one or more of a code division multiple access wireless network, a time division multiple access wireless network, a global system for mobile communications wireless network, a universal mobile telecommunications system wireless network, and an advanced mobile phone service wireless network, and the wireless local area network comprises one or more of an 802.11x wireless network, a Bluetooth wireless network, a HomeRF wireless network, a HiperLAN wireless network, or a Multichannel Multipoint Distributions Service wireless network.

4. The method of claim 2, wherein:
the communication is voice communication, and
the first network provides a voice over internet protocol.

5. The method of claim 1, wherein the first network is a digital network and the second network is an analog network.

6. The method of claim 1, wherein determining that switching to the second network is warranted includes determining that the multi-mode wireless device is within a predetermined distance from a designated location.

7. The method of claim 1, wherein determining that switching to the second network is warranted includes determining that the second network satisfies a user preference.

8. The method of claim 1, wherein continuing the communication using the multi-mode wireless device via the second network includes concurrently continuing the communication using the multi-mode wireless device via the first network and the second network and subsequently discontinuing the communication using the multi-mode wireless device via the first network.

* * * * *